Figure 1:
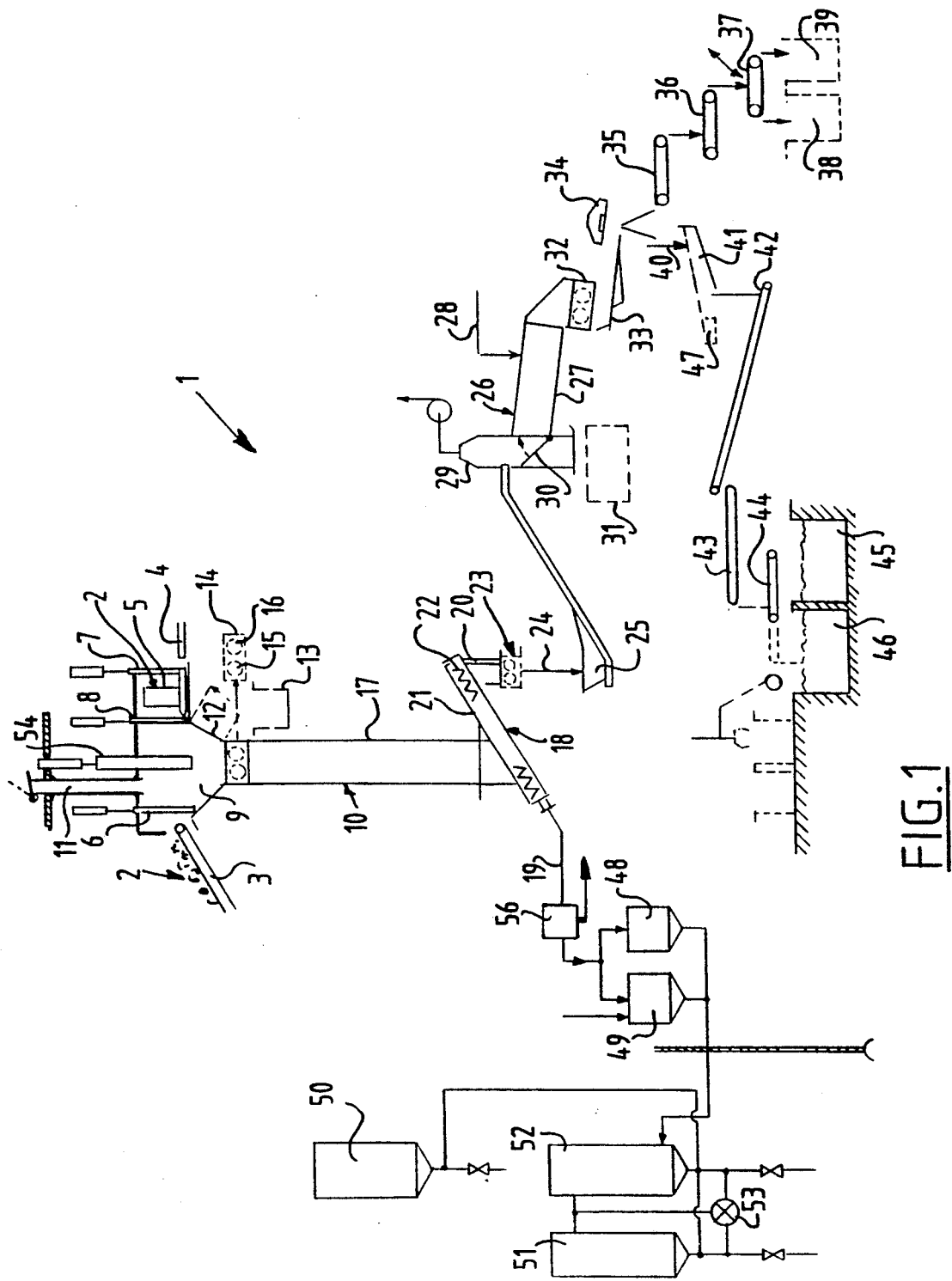

United States Patent

Snellink et al.

[11] Patent Number: 5,168,727
[45] Date of Patent: Dec. 8, 1992

[54] METHOD AND DEVICE FOR TREATING WASTE

[75] Inventors: Jan H. Snellink, Hengelo; Adrianus J. Visser, Zwolle, both of Netherlands

[73] Assignee: Leto Recycling B.V., Aadorp, Netherlands

[21] Appl. No.: 773,677

[22] Filed: Oct. 8, 1991

[30] Foreign Application Priority Data

Oct. 9, 1990 [NL] Netherlands ............... 50 02193

[51] Int. Cl.⁵ .......................... B03B 1/00; B03C 1/30
[52] U.S. Cl. .............................. 62/532; 209/11; 209/215
[58] Field of Search .............. 62/532; 209/38, 11, 209/215, DIG. 930

[56] References Cited

U.S. PATENT DOCUMENTS

| | | | |
|---|---|---|---|
| 2,998,882 | 9/1961 | Leeman | 209/38 X |
| 3,650,396 | 3/1972 | Gillespie | 209/11 X |
| 4,126,160 | 6/1978 | Gurtler | |
| 4,243,520 | 1/1981 | Denev | 209/38 X |
| 4,342,647 | 8/1982 | McMillan | 209/11 X |
| 4,804,147 | 2/1989 | Hooper | 209/38 X |

FOREIGN PATENT DOCUMENTS

| | | |
|---|---|---|
| 0044507 | 1/1982 | European Pat. Off. |
| 0119079 | 9/1984 | European Pat. Off. |
| 3900482 | 2/1980 | Fed. Rep. of Germany |
| 3443042 | 5/1986 | Fed. Rep. of Germany |
| 7702333 | 3/1977 | Netherlands |

Primary Examiner—Alan Cohan
Attorney, Agent, or Firm—Christensen, O'Connor, Johnson & Kindness

[57] ABSTRACT

The invention relates to a method for treating waste comprising the steps of:
 i) shredding the waste;
 ii) separating liquid;
 iii) subjecting the separated solid waste to a cold treatment; and
 iv) separating product remnants, and to a device for treating waste, comprising:
 i) a shredder unit;
 ii) a unit for separating liquid out of the shredded material;
 iii) a cold treatment unit for the shredded material; and
 iv) a unit for separating product remnants.

15 Claims, 1 Drawing Sheet

METHOD AND DEVICE FOR TREATING WASTE

The present invention relates to a method and a device for treating waste.

The waste for treating with this method and device comprises packaging materials such as metals, plastics, glass and ceramic materials, product remnants originally packed in the above mentioned packaging materials, product remnants named hereinafter which can have a solid, liquid or highly viscous consistency, such as paint, ink, glue, mastic, oil, highly viscous organic products, and in addition organic and watery liquids and, finally, miscellaneous including materials originating for example from the packaging material or the product remnants including plastics, wood, fibres, textiles, ferrous and non-ferrous metals.

The invention has for its object to provide a method and a device with which the greatest possible number of re-usable and possibly valuable fractions can be separated from the waste so that the quantity of waste for dumping or being taken away for burning can be limited or made more suitable therefor.

During the research that eventually resulted in the present invention it was found that a separation can be made in comparatively simple manner between packaging material and product remnants, wherein separated metal, glass and/or plastic can be returned to the respective processing industry, optionally after further purification.

The method according to the invention for treating waste is therefore characterized in that it comprises the steps of:
i) shredding the waste;
ii) separating liquid;
iii) subjecting the separated solid waste to a cold treatment; and
iv) separating product remnants.

The device according to the invention for treating waste is characterized in that it comprises:
i) a shredder unit;
ii) a unit for separating liquid from the shredded material;
iii) a cold treatment unit for the shredded material; and
iv) a unit for separating product remnants.

It was found during research, namely, that by cooling the shredded waste to below the glass temperature (Tg) of the product remnant fraction, this now solid fraction is so brittle that it can easily be removed from metal surfaces, for instance under the influence of vibrations. A very easy separation between this released fraction and a metal fraction can be performed in the case of ferromagnetic metal using a magnet.

The cold treatment is preferably performed using a liquid coolant so that an optimum heat transfer from the waste to the liquid coolant can take place. The liquid coolant preferably consists of liquid nitrogen which, after performing its function, can be discharged as gas. Other suitable coolants comprise solid $CO_2$ or a mixture of acetone and solid $CO_2$.

In preference the material treated with the liquid coolant is vibrated with an impactor such as a mill provided with impacting strips such as a so-called impacting mill, since it has been found that through vibration adhering product remnants are now released from metal, tinplate, ceramics and plastic. It has further been found that paint, mastic and any glue particles have a regular size, for instance in a particle size range of 1-2 cm, among other reasons through being loosened by vibration, while tinplate, ceramics and plastic have an irregular form. This variation is mainly dependent on the nature of the materials.

Finally, it is possible to separate the plastic fraction into different types of plastic by performing a separation according to density of the ground particles.

Mentioned and other features of the method and device according to the invention for treating waste will be elucidated hereinafter in the light of the description of a non-limitative embodiment, wherein reference is made to the annexed drawing, in which:

FIG. 1 is a schematically depicted flow diagram of a treating device according to the invention.

FIG. 1 shows a device 1 according to the invention for treating waste 2. This waste 2 comprises metal such as paint cans of steel and tin, paint remnants such as paint cakes, pigments, inks and dyes, solvents such as water and hydrocarbons, plastics such as plastic paint buckets and compound, highly viscous organic substances such as oils, glue and mastic, and miscellaneous including paint brushes, paint rollers and fabric. It is the objective to separate as much liquid, metal, plastic, wood and textile as possible from the paint, mastic and glue remnants.

The waste 2 can be supplied via a conveyor belt 3 for hand-sorted waste or via a conveyor belt 4 for pails 5 via controllable sluices 6–8 to the feed funnel 9 of a shredder unit 10.

The feed funnel 9 is provided with an explosion flap 11 in order to blow off pressure in the case of an undesired explosion. The feed funnel 9 is further provided with a swingaway wall 12 for discharge of non-shreddable material to a container 13. The shredder means 14, which consists of oppositely rotating knives 15, 16, is removably arranged. Introduced material is pressed against the shredder knives 55 using a ram unit 54.

The shredded material is fed via a discharge duct 17 to a separating unit 18 in which liquid 19 is separated from the shredded material 20.

The separating unit 18 comprises an upward inclining worm 22 accommodated with clearance in a worm housing 21. Using a rinsing unit (not shown) the shredded material 20 can be rinsed with a suitable solvent.

The shredded material 20, which is shredded once again if desired with a second shredder means 23, is fed via channel 24 to a conveyor 25, from which the material is carried to a cold treatment unit 26.

The cold treatment unit comprises a rotating drum 27 inclining downward in downstream direction and provided with mixing members (not shown). Via a conduit 28 liquid coolant, in this case liquid nitrogen, is added to the drum 27. The liquid coolant is guided in a flow counter to the shredded material for cooling and is finally discharged via an exhaust duct 29. The exhaust duct 29 is provided with a valve 30 for the purpose of enabling discharge of shredded material to a container 31 in emergency situations.

In the rotating drum 27 the shredded material is cooled to below the glass temperature of the paint remnants present in the waste.

The cold, shredded material is vibrated in an impactor 32 and unloaded therefrom onto a conveyor belt 33. The conveyor belt 33 carries the still cold, shredded material past a magnet 34 provided with a vibrating chute which attracts and then deposits the ferromagnetic material on a conveyor belt 35 for separated ferromagnetic material. The latter eventually drops via the conveyor belts 36 and 37 into a container 38 for steel or a container 39 for tinplate.

The still cold, shredded non-metal material falls via the line 40 onto a vibrating screen 41 with a mesh size of approximately 1-2 cm.

Paint, glue and/or mastic remnants, still cooled to below glass temperature, pass through the screen and are carried away via the conveyor belts 42, 43 and 44 to paint waste pits 45 and 46.

Remaining behind on the vibrating screen 41 are wood, textile and plastic. Retained plastic can be further ground and classified according to density in a unit 47. Any non-ferromagnetic material that may be present can be separated in a separation according to density, such as water immersion.

The liquid 19, separated in the separating unit 18, is fed, after magnetic removal of fine ferromagnetic particles with a unit 56, to storage tanks 48, 49 and, optionally after admixing with non-distillable dilution liquid from a tank 50, thereafter carried to discharge tanks 51 and 52. The liquid can be discharged herefrom to an incinerator, optionally after adjustment of the viscosity and adapting of the particle size with a grinding unit 53. If desired, it is possible using the drained separated liquid to further treat paint and oil from the waste pits 45 and 46 and return them to the paint industry.

By means of the device 1 according to the invention the waste 2 is separated into a liquid fraction 19, a metal fraction, a paint, glue and/or mastic fraction and a remnant fraction, which can optionally be further divided into different plastic fractions, a wood fraction and a textile fraction.

We claim:

1. Method for treating waste comprising the steps of:
   i) shredding the waste;
   ii) separating liquid;
   iii) then subjecting the shredded separated solid waste to a cold treatment; and
   iv) separating product remnants.

2. Method as claimed in claim 1, wherein the cold treatment is performed using a liquid coolant.

3. Method ass claimed in claim 2, wherein the coolant is liquid nitrogen.

4. Method as claimed in claim 1, wherein the material subjected to the cold treatment is vibrated.

5. Method for treating waste comprising the steps of:
   i) shredding the waste;
   ii) separating liquid;
   iii) subjecting the separated solid waste to a cold treatment; and
   iv) separating product remnants, wherein a paint fraction and a plastic fraction are separated out of the shredded material.

6. Method as claimed in claim 5, wherein separating is performed by means of screening.

7. Method for treating waste comprising the steps of:
   i) shredding the waste;
   ii) separating liquid;
   iii) subjecting the separated solid waste to a cold treatment; and
   iv) separating product remnants, wherein a plastic fraction is ground and the ground plastic material is separated according to density.

8. Method for treating waste comprising the steps of:
   i) shredding the waste, wherein the shredded waste is rinsed with a solvent;
   ii) separating liquid;
   iii) subjecting the separated solid waste to a cold treatment; and
   iv) separating product remnants.

9. Device for treating waste, comprising:
   i) a shredder unit for producing shredded material from the waste;
   ii) a unit for separating liquid out of the shredded material;
   iii) a cold treatment unit coupled to the liquid separating unit for receiving and cold treating the shredded material; and
   iv) a unit for separating product remnants.

10. Device as claimed in claim 9, wherein the cold treatment unit comprises a rotating drum.

11. Device as claimed in claim 9, wherein the cold treatment unit is provided with an inlet for liquid coolant.

12. Device as claimed in claim 9, wherein an impactor connects onto the cold treatment unit.

13. Device as claimed in claim 12, wherein a separated fraction containing paint, glue, mastic and plastic is fed to a screening unit.

14. Device as claimed in claim 13, wherein the mesh size of the screening unit amounts to approximately 1-2 cm.

15. Device as claimed in claim 9, in which is incorporated a rinsing unit for rinsing shredded waste with a solvent.

* * * * *

UNITED STATES PATENT AND TRADEMARK OFFICE
CERTIFICATE OF CORRECTION

PATENT NO. : 5,168,727
DATED : December 8, 1992
INVENTOR(S) : J.H. Snellink et al.

It is certified that error appears in the above-identified patent and that said Letters Patent is hereby corrected as shown below:

| COLUMN | LINE | ERROR |
|---|---|---|
| 3 | 44 | "ass" should read --as-- |
| 4 | 46-48 | Delete Claim 15 in its entirety and insert therefor |

--15. Device for treating waste, comprising:
    i)      a shredder unit;
    ii)     a unit for separating liquid out of the shredded material;
    iii)    a rinsing unit for rinsing shredded waste with a solvent;
    iv)    a cold treatment unit for the shredded material; and
    v)      a unit for separating product remnants.--

Signed and Sealed this

Twenty-sixth Day of October, 1993

*Attest:*

BRUCE LEHMAN

*Attesting Officer*      *Commissioner of Patents and Trademarks*